US011612532B2

(12) United States Patent
Obert (10) Patent No.: US 11,612,532 B2
(45) Date of Patent: Mar. 28, 2023

(54) ADJUSTABLE OPERATING COLUMN COMPRISING A POWER AND/OR DATA LINE GUIDE DEVICE

(71) Applicant: MAQUET GMBH, Rastatt (DE)

(72) Inventor: Mike Obert, Gernsbach (DE)

(73) Assignee: MAQUET GMBH, Rastatt (DE)

( * ) Notice: Subject to any disclaimer, the term of this patent is extended or adjusted under 35 U.S.C. 154(b) by 72 days.

(21) Appl. No.: 17/280,697

(22) PCT Filed: Sep. 26, 2019

(86) PCT No.: PCT/EP2019/075977
§ 371 (c)(1),
(2) Date: Mar. 26, 2021

(87) PCT Pub. No.: WO2020/064903
PCT Pub. Date: Apr. 2, 2020

(65) Prior Publication Data
US 2022/0000696 A1 Jan. 6, 2022

(30) Foreign Application Priority Data

Sep. 28, 2018 (DE) .......................... 102018124134.8

(51) Int. Cl.
*A61G 13/06* (2006.01)
*H02G 11/00* (2006.01)
(52) U.S. Cl.
CPC ............. *A61G 13/06* (2013.01); *H02G 11/00* (2013.01)
(58) Field of Classification Search
CPC ........ A61G 13/04; A61G 13/06; A61G 13/08; H02G 11/00
See application file for complete search history.

(56) References Cited

U.S. PATENT DOCUMENTS 3,206,188 A 9/1965 Douglass
4,101,120 A * 7/1978 Seshima ................ A61G 13/02
5/616

(Continued)

FOREIGN PATENT DOCUMENTS

CN 104563705 A * 4/2015 ......... B60R 16/0215
CN 209313394 U * 8/2019 ............. H02G 11/00

(Continued)

OTHER PUBLICATIONS

International Search Report and Written Opinion dated Dec. 19, 2019 in corresponding International Patent Application No. PCT/EP2019/075977, 14 pages.

(Continued)

*Primary Examiner* — David R Hare
*Assistant Examiner* — Alexis Felix Lopez (57) ABSTRACT

An adjustable table column (1) for an operating table, comprising a column base (2) for placing the table column (1) on a floor, a height-adjustable column shaft (3) with a stationary column shaft base (24), and a column shaft stem (40) that can be moved up and down relative to the column shaft base, a connection unit (10) for connecting a patient support surface to the table column (1), wherein the connection unit (10) is pivotable in relation to the column shaft stem (40), and a cable routing device (4) for carrying at least one power and/or data cable (5) along the column shaft stem (40) during its up and down movement, wherein the cable routing device (4) comprises an articulated push rod (11) which can transmit pushing and pulling forces. The upper end (17) of the push rod (11) is mechanically connected to the connection unit (10), and its lower end (18) is mechanically connected to the column shaft stem (40), such that the at least one power and/or data cable (5) adjusts its position accordingly when moving the connection unit (10).

20 Claims, 5 Drawing Sheets

(56) References Cited

U.S. PATENT DOCUMENTS

| | | | | |
|---|---|---|---|---|
| 4,749,177 | A * | 6/1988 | Schafer | A61G 13/00 |
| | | | | 5/610 |
| 6,416,022 | B1 * | 7/2002 | Crespi | F16G 13/16 |
| | | | | 59/78.1 |
| 6,481,195 | B1 * | 11/2002 | Blase | H02G 11/006 |
| | | | | 248/51 |
| 10,835,437 | B2 * | 11/2020 | Revenus | A61G 13/06 |
| 2005/0066861 | A1 * | 3/2005 | DeBraal | A47B 9/00 |
| | | | | 108/147 |
| 2006/0042175 | A1 * | 3/2006 | Crespi | B66C 23/701 |
| | | | | 52/111 |
| 2018/0097345 | A1 * | 4/2018 | Inoue | B60R 16/027 |
| 2018/0140408 | A1 | 5/2018 | Kim | |
| 2020/0325962 | A1 * | 10/2020 | Hermey | H02G 11/00 |
| 2020/0345571 | A1 * | 11/2020 | Clayton | A61G 13/06 |

FOREIGN PATENT DOCUMENTS

| | | | | |
|---|---|---|---|---|
| DE | 1048674 | A | | 1/1959 |
| DE | 102015100542 | A1 | | 7/2016 |
| EP | 3213730 | A1 | | 9/2017 |
| WO | WO-9635887 | A1 * | 11/1996 | ............. F16G 13/16 |
| WO | WO-2019043155 | A1 * | 3/2019 | ............... A47B 9/20 |

OTHER PUBLICATIONS

Search Report issued in corresponding German Application No. 102018124134.8 dated Sep. 28, 2018, 3 pages.

IGUS Gmbh: "1. vector award '08", Apr. 14, 2008 (Apr. 14, 2008), pp. 1-76, XP055649619, retrieved from the Internet: URL: https:/ /www.igus.eu/contentData/wpck/ pdf/ global/V ector_ Broschuere_SCREEN. pdf [retrieved on Dec. 5, 2019].

Stryker Communications: "Vertier(TM) Surgical Table Service Manual", Feb. 22, 2012 (Feb. 22, 2012), pp. 1-355, XP055649632, retrieved from the Internet: URL: http:// www.frankshospitalworkshop.com/ equipment/ documents/operating_tables/service_manuals/ Stryker% 20Vertier% 20Surgical % 20Table% 20-% 20Service% 20manual. pdf [retrieved on Dec. 5, 2019].

Website Accessed Jan. 22, 2018—igus® cable carrier for mobile operating table, 3 pages.

* cited by examiner

Fig. 6

ADJUSTABLE OPERATING COLUMN COMPRISING A POWER AND/OR DATA LINE GUIDE DEVICE

TECHNICAL AREA

The present disclosure relates to adjustable table columns for operating tables.

BACKGROUND OF THE DISCLOSURE

Operating table columns usually include a column base for placing the table column on the floor of an operating room, a height-adjustable column shaft mounted on the column base, and a patient support surface arranged on an upper end of the column shaft.

The actuators of the table column must be supplied with power for allowing the patient support surface of such a table column to be brought to the appropriate height and to be both laterally tilted and inclined depending on the type of surgical intervention to be performed.

The use of electrical cables in the form of stretchable spiral cables for this purpose is known from practice. However, spiral cables are susceptible to overstretching and can easily get tangled when using multiple cable bundles.

Schaerer Mayfield has developed a solution that is based on energy chains and thus circumvents this problem.

This solution is described on page 37 of the brochure accompanying this application. This brochure reflects the competition entries for the "Vector Award" competition organized by IGUS in 2008.

To supply power to the "Arcus" operating table, Schaerer uses a zigzag chain with an axial passage to accommodate cables and hoses. An upper end of the energy chain is fastened to an upper section of a height-adjustable column part and below a guide bracket. A lower end of the guide chain is fastened to a lower portion of the column part. The guide chain is arranged laterally on the column part, such that the routing of the supply lines can vary in a specific, limited area. The position of the guide bracket changes with the height adjustment of the generic operating table column, and thus the height of the upper end of the guide chain changes as well. In this way, the flexible guide chain with the sheathed cables is deformed between a compressed S-shaped section and an elongated section.

The cable routing according to page 37 of the enclosed brochure is, however, not suitable for applications in which several cables have to be routed from a power supply and/or control unit located in the column base to the patient support surface connection unit.

This is due to the fact that the connection unit can be pivoted relative to the column shaft stem. An energy chain can very well compensate for the up and down movements of the column shaft stem, but not for tilting and inclining the connection unit.

Furthermore, the cable routing according to Schaerer, in which the entire length of the guide chain is arranged on a height-adjustable part of the generic table column, leads to a certain amount of required space to accommodate the width of the chain. In the case of operating tables that have numerous power and data cables, the chain must be dimensioned accordingly large, which increases this space requirement.

SUMMARY OF THE DISCLOSURE

It is an object of the present disclosure to provide an adjustable table column for an operating table, in which data and/or power cables are safely and reliably guided from the column shaft stem into the patient support surface connection unit. Particularly the cables should be routed in such a way that they can compensate for both a height adjustment of the column shaft and for pivoting the connection unit without interference.

It is another object of the present disclosure to provide an adjustable table column for an operating table in which the space requirement for cable and hose routing is small.

The disclosure is also based on the object of creating a low-wear and abrasion-free solution for the cabling of an adjustable table column, in which the cable length and the alignment of the cable routing can be changed quickly and in a targeted manner.

Apparently, these objects are achieved with an adjustable table column for an operating table, which has at least one of the following features:
- a column base for placing the table column on a floor;
- a height-adjustable column shaft with a stationary column shaft base and a column shaft stem that can be moved up and down relative to the column shaft base;
- a connection unit for connecting a patient support surface to the table column, wherein the connection unit is pivotable in relation to the column shaft stem; and
- a cable routing device for carrying at least one power and/or data cable along the column shaft when the shaft moves up and down, the cable routing device comprising an articulated push rod that can transmit push and pull forces, wherein the upper end of the push rod is mechanically connected to the connection unit and its lower end is mechanically connected to the column shaft stem, such that the at least one power and/or data cable adjusts its position accordingly when the connection unit is moved.

Thanks to the articulated push rod according to the disclosure, the cables can reproduce the pivoting movements and up and down movements of the connection unit, such that they are safely guided in every position of the connection unit.

The present table column ensures a reliable, safe and precise length compensation of the routed cables and hoses.

The lower end of the push rod can be assigned to the column shaft stem via a first joint and the upper end of the push rod can be fastened to the connection unit via a second joint.

In some embodiments of the present table column, the push rod can be curved. Furthermore, the first joint can be a ball joint. The second joint can be a universal joint, a constant velocity joint, or a flexible spring or rubber joint.

The connection unit of the table column disclosed here can be pivoted by means of a pivot joint and the second joint can have the same orientation as the pivot joint.

In other embodiments of the present table column, the cable routing device can further comprise a linear guide. The linear guide can be used for vertical movement of the at least one power and/or data cable when adjusting the height of the column shaft. It can comprise a rail and a carriage that can be moved on the rail. The at least one power and/or data cable can be fastened to this carriage.

The cable routing device can also have a magazine for stowing excess cable length. The magazine can be arranged in the column base.

In some embodiments of the present table column, the cable routing device can have an energy chain which, for example, houses the at least one power and/or data cable.

The upper end of the energy chain can be fastened to the linear guide and, for example, to its carriage, and/or its lower end can be fastened in the magazine. The lower part of the energy chain can be arranged in the form of a horseshoe, for example inside the magazine. The horseshoe can be arranged upright on the edge or lying flat in the magazine.

Such a configuration of the routing device allows the table column to be adjusted in height without stressing the supply cables and hoses. The space required for routing cables and hoses is kept low. The cables and hoses are routed reliably and securely from the column base to the connection unit.

The present disclosure additionally relates to operating tables that comprise the adjustable table columns described herein. The operating tables according to the disclosure have a power and/or data cable routing device. They can also have various medical and/or surgical devices and monitors connected to them, for example to their table columns.

The present disclosure also relates to methods for using table columns and/or operating tables in, for example, surgical interventions on patients, as well as methods for readjusting such columns or tables.

BRIEF DESCRIPTION OF THE DRAWINGS

Exemplary embodiments of the present disclosure are explained in more detail below based on the figures. Wherein.

DETAILED DESCRIPTION OF THE FIGURES

Exemplary embodiments of the present disclosure are described with reference to the drawings in the description below. The drawings are not necessarily true to scale, but are only intended to illustrate the respective features schematically.

It should be noted that the features and components described below can each be combined with one another, regardless of whether they have been described in connection with a single embodiment. The combination of features in the respective embodiments only serves to illustrate the basic structure and the mode of operation of the claimed device.

Figure 1:
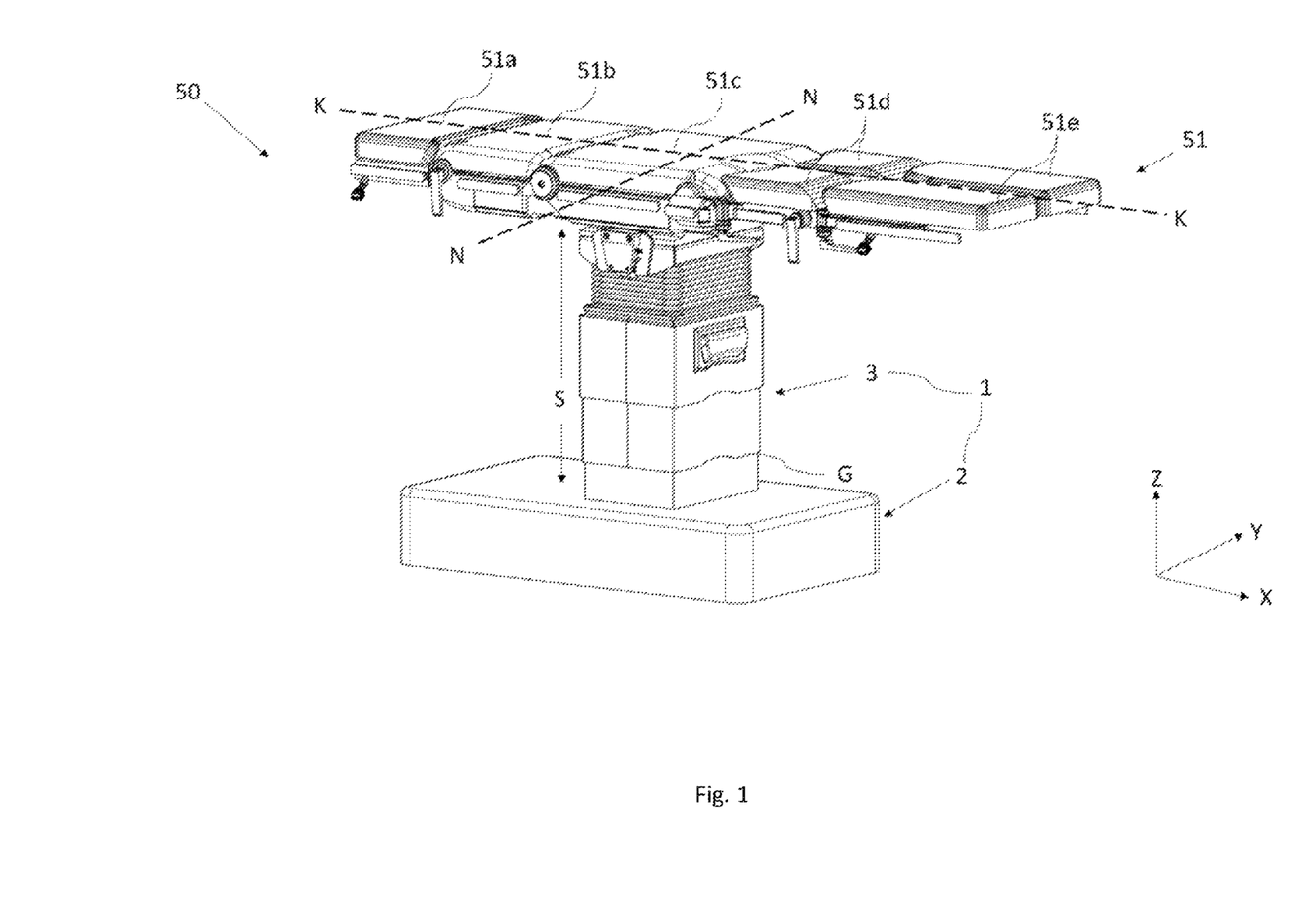
FIG. 1 is an overall view of an operating table with a table column according to the disclosure and a patient support surface.

FIG. 1 shows an operating table 50 according to the disclosure, which can be used for various medical purposes, such as, for example, surgical interventions on patients. For this purpose, a patient to be treated is positioned on the operating table 50.

The operating table 50 shown in FIG. 1 comprises a height-adjustable table column 1 and a patient support surface 51, for example detachably arranged on an upper end of the table column 1.

The patient support surface 51 is designed in several parts and can be expanded as required. It comprises the following detachable modules: a head module 51a, a back module 51b, a seat module 51c and two leg modules 51d, e, which extend along a longitudinal axis of the operating table 50. The patient support surface 51 can be pivoted about a tilt axis KK and an inclination axis NN.

The table column 1 comprises a column base 2 for placing the operating table 50 on a base and a column shaft 3 arranged vertically on the column base 2.

The height S of the column shaft 3 can be adjusted by means of an internal mechanism arranged in a housing G.

For a better illustration of the components of the operating table 50, a Cartesian coordinate system XYZ is shown in the figures. The Z-axis is the vertical axis, the X-axis the horizontal longitudinal axis, and the Y-axis the horizontal transverse axis. Accordingly, the X-axis corresponds to the axis along which a patient lies on the patient support surface 51 of the operating table 50 during an operation. The Y-axis runs transversely to the X-axis. The X-axis is also known as the tilt axis. The Y-axis forms the inclination or Trendelenburg axis.

Figure 2:
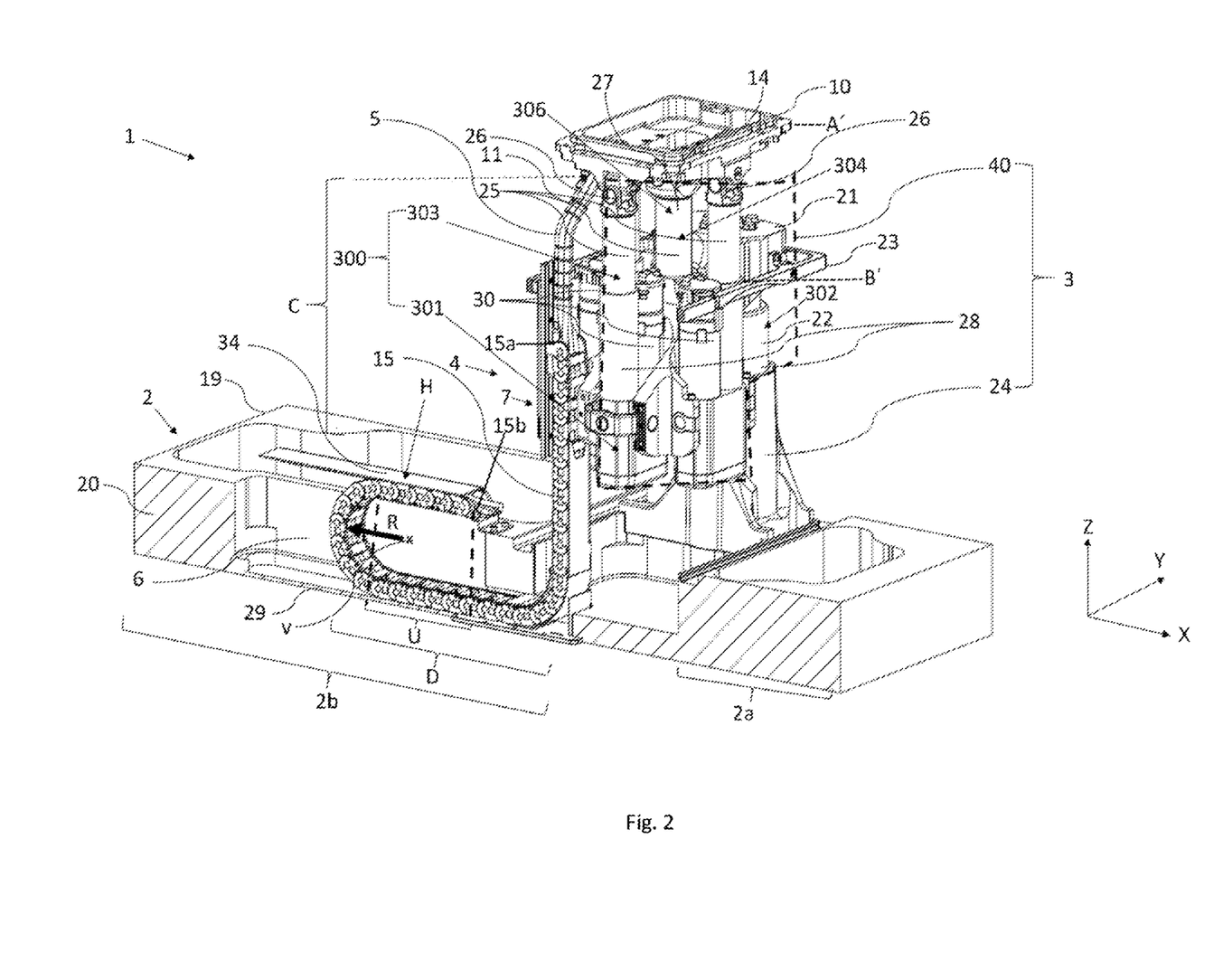
FIG. 2 is a perspective view of the table column according to the disclosure of FIG. 1 without cover, with a column base, a column shaft, and a cable routing device.

FIG. 2 shows the table column 1 of the operating table 50 according to the disclosure. This adjustable table column 1 comprises, from bottom to top, the column base 2, the height-adjustable column shaft 3 with a stationary column shaft base 24 and a column shaft stem 40 that can be moved up and down relative to the column shaft base 24, as well as a connection unit 10 for connecting the patient support surface 51 to the table column 1.

The column base 2 enables the table column 1 to stand securely on the floor of an operating room. It comprises a preferably rectangular frame 19. The frame 19 has a vertical collar 20, a lower plate 29, and a two-part upper cover (not shown) (FIG. 2).

The column base 2 has two sections of different lengths. It comprises a short section 2a, which is located at the foot end of the table column 1, i.e. at that end of the table column 1 which, in use, is inclined below the outermost leg module 51e which supports the patient's feet.e The column base 2 also has a long section 2b which is located at the head end of the table column, i.e. at the end of the table column 1 which, in use, is inclined below the head module 51a on which the patient's head is positioned.

The two sections 2a, 2b each form a receiving space, for example for receiving excess cable and hose length, power supply units, pneumatic and hydraulic components, and communication or control modules.

The column shaft 3 is arranged on the column base 2 such that it is offset in its longitudinal direction along the X-axis in relation to the center of the column base 2 (FIG. 2).

The column shaft 3 is divided into a lower column shaft base 24 and an upper column shaft stem 40. The column shaft stem 40 comprises a column head carrier 21, as well as a column head 300 which is carried by the column head carrier 21. The column head 300 extends between the column head support 21 and the connection unit 10. The column head 300 is divided into a column head base 301 and a column head adjustment unit 303 which is height-adjustable in relation to the column head base 301.

For height adjustment, the table column 1 has a main lifting device 302 and an additional lifting device 304.

With the main lifting device 302, the column shaft stem 40 can be moved up and down relative to the column shaft base 24. The main lifting device 302 is designed as a first cylindrical telescopic guide 22. The column head support 21 is fastened to the upper end of the first telescopic guide 22.

With the additional lifting device 304, the column head adjusting unit 303 can be moved up and down relative to the column head base 301. The additional lifting device 304 is designed as a second cylindrical telescopic guide 306. The connection unit 10 is fastened to the upper end of the second telescopic guide 306.

In some embodiments of the present operating table column 1, the connection unit 10 has a rectangular shape. It is used to fasten the patient support surface 51 to the operating table column 1. In some embodiments, for example in the case of so-called system tables, the patient support surface 51 can be detachably fastened to the operating table column 1. In other embodiments, such as, for example, in the case of mobile operating tables, the seat module 51c of the patient support surface 51 can be firmly connected to the column shaft 3 of the table column 1 by means of the connection unit 10.

Figure 3:
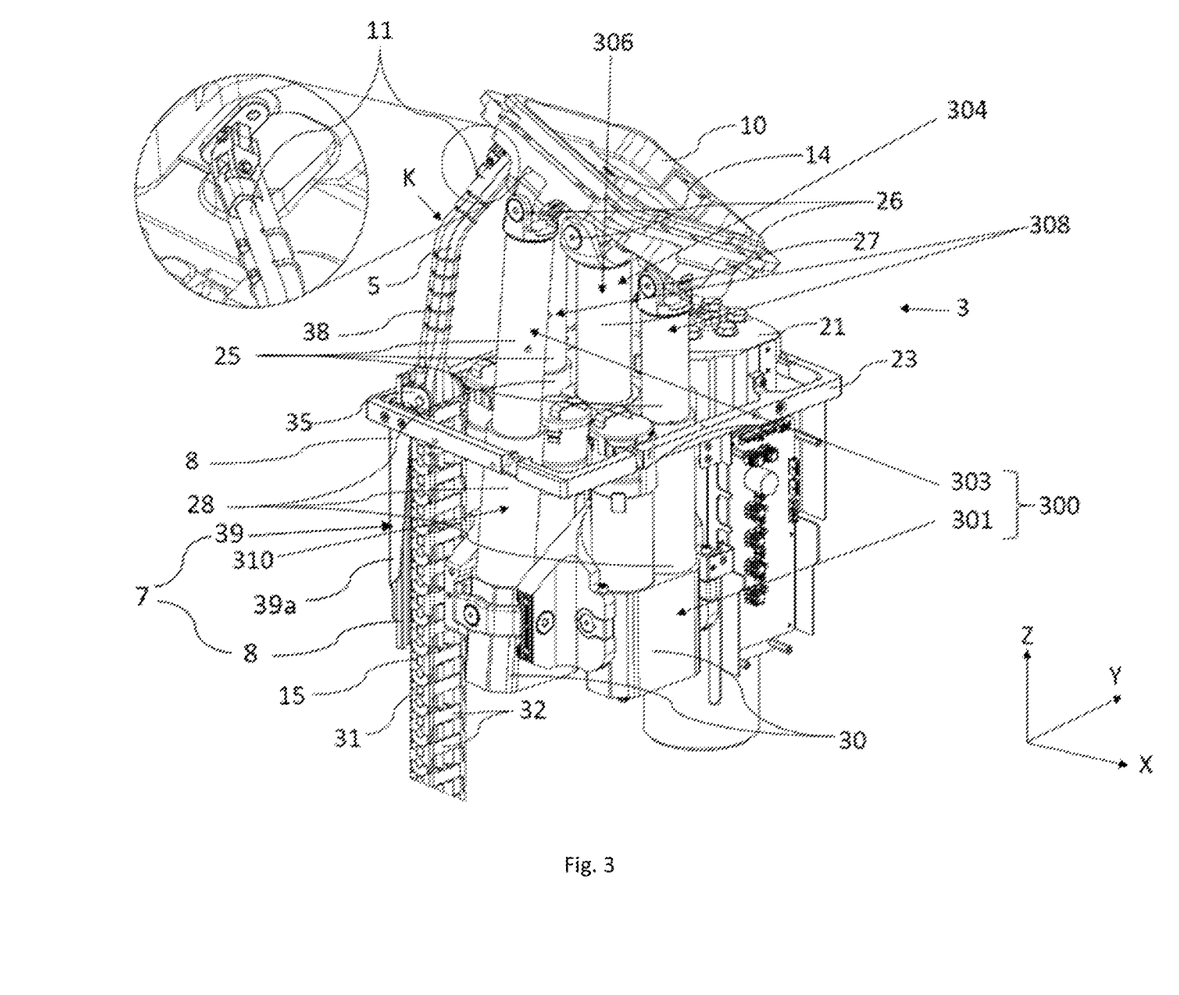
FIG. 3 is a perspective view of an upper assembly of the table column of FIG. 2 with a pivoted connection unit for the patient support surface as well as parts of the cable routing device.

FIG. 3 is an enlarged view of the assembly consisting of the column head carrier 21, the column head 300, and the connection unit 10. The additional lifting device 304 can be seen. This device has three driven lifting cylinders 25 and a central guide cylinder 27 without a drive. The connection unit 10 is articulated to the central guide cylinder 27 by means of a central joint 14. The joint 14 is designed in such a way that it allows both inclining and laterally tilting the connection unit 10, in each case about the Y-axis and the X-axis. For this purpose, the central joint 14 has two rotational degrees of freedom which allow pivoting about the X and Y-axes. It can for example be designed as a gimbal universal joint.

The additional lifting device 304 of the column head 300 is at the same time a inclining device 308 and a tilting device 310. With the inclining device 308, the connection unit 10 can be inclined about the Y-axis. With the tilting device 310, the connection unit 10 can be tilted about the X-axis.

The device 304, 308, 310 designed for lifting, tilting, and inclining comprises a group of three driven lifting cylinders 25 which can be adjusted along the vertical Z-axis and are each arranged in outer cylindrical guides 28, and the central guide cylinder 27. The guide cylinder 27 is surrounded by the three peripheral lifting cylinders 25. The peripheral lifting cylinders 25 are spaced apart from one another and their upper ends are each connected to the bottom side of the connection unit 10 by means of a joint 26. The two opposite lifting cylinders 25 belong to the inclining device 308. The remaining third lifting cylinder 25 belongs to the tilting device 310.

A separate, for example, electric motor drive 30 is provided for each of the three extendable peripheral lifting cylinders 25. The motor drives 30 are positioned in a housing in the column head base 301. The central guide cylinder 27 does not have its own drive.

With such a configuration of the operating table column 1, the connection unit 10 or a patient support surface connected thereto can be inclined or its lateral tilt be changed by means of different adjusting movements. In addition, the height of the connection unit 10 can be changed with a simultaneous adjusting movement of the three motor drives 30 in the same direction of adjustment, i.e. the unit can be lifted or lowered without changing its lateral tilt or inclination. The height adjustment of the connection unit 10 along the vertical Z-axis can take place between a lower stroke position B' and an upper stroke position A' (see FIG. 2).

FIG. 2 also shows a cable routing device 4 according to the disclosure for routing at least one power and/or data cable 5. For example, the cable routing device 4 is used to securely route a cable and hose bundle 5 from the column base 2 into the connection unit 10.

The power and/or data cables 5 can include various cables and/or hoses that are used, for example, to connect the height-adjustable operating table 50 and/or surgical tools that are arranged on the table column 1 and/or on the patient support surface 51 to supply them with power and/or to control them. For example, the cables and hoses 5 can be used in connection with an operating table which comprises joint devices which are set in motion by means of a motor force for the purpose of treating patients.

The cable routing device 4 comprises, viewed from bottom to top, a magazine 6, an energy chain 15, a linear guide 7 and a push rod 11.

The cable routing device 4 has two sections, namely, a guide section C and a storage section D (see FIG. 2). The guide section C of the guide device 4 extends in the vertical Z direction from the column base 2 to the connection unit 10 laterally along the height-adjustable column shaft 3 of the table column 1. The guide section C comprises a vertical section of the energy chain 15, the linear guide 7 and the push rod 11.

The storage section D of the guide device 4 comprises a section of the energy chain 15 arranged in the column foot 2. This chain section is housed in the magazine 6, which serves as a reserve for excess cable and/or hose length. This is because the height adjustment of the table column 1 and the pivoting of the connection unit 10 create a great need for cable and/or hose length adjustment. For certain applications, the cable and hose length in the vertical Z direction of the table column 1 must be varied by up to 570 mm. These 570 mm are composed, for example, of about 320 mm for the lifting movement of the main lifting device 302, about 200 mm for the lifting movement of the additional lifting device 304 and about 50 mm for the pivoting movements of the connection unit 10.

This change in length of up to 570 mm is compensated for by the shape and configuration of the guide device 4. Part of the compensation takes place thanks to the energy chain 15. The energy chain 15 comprises a plurality of articulated chain links 31 in the form of tabs, each of which comprises two sides arranged parallel to one another with a plurality of spaced apart transverse webs 32 that define a guide channel for cables and hoses 5. The chain links 31 are dimensionally stable, torsion resistant, and torsionally rigid. In some embodiments of the energy chain 15, the transverse webs 32 can be releasably fastened to the tabs 31 by latching means to release the interior of the energy chain 15.

Figure 4:
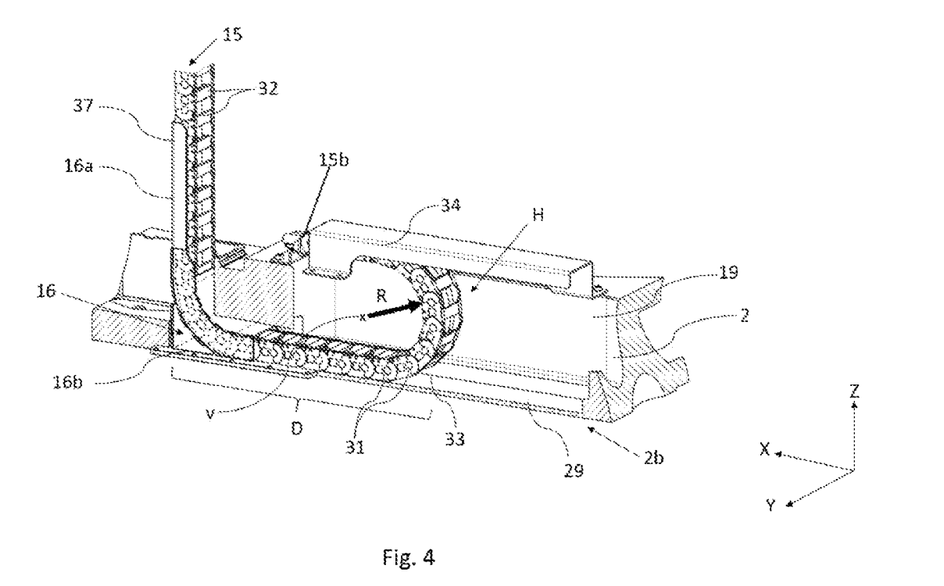
FIG. 4 is a perspective view of a section of the cable routing device of FIG. 2 arranged in the column base.

FIG. 4 shows the arrangement of the storage section D in the long section 2b of the column base 2. There, a section of the energy chain 15 is guided horizontally parallel to the X axis on the lower plate 29 in a guide rail 33. This section ends in a bend around a V-V axis running parallel to the Y axis. The end of the energy chain 15 located in the interior of the magazine forms an arc with a radius R and an overlap area (U, see FIG. 2) with two mutually perpendicular and spaced apart sections. The lower end 15b of the energy chain 15 faces the column shaft base 24 and forms an upper overlapping section which is enclosed from above by a mounting rail 34 fastened to the frame 19 of the column base 2. The mounting rail 34 can be U-shaped, for example.

The lower part of the energy chain 15 arranged in the magazine 6 has the shape of a horseshoe H. This configuration of the energy chain 15 enables an active compensation of the cable and/or hose length during the lifting and swiveling movements of the table column 1. For example, the overlap area U becomes shorter and thus the horseshoe H becomes smaller when the connection unit 10 moves upwards. On the other hand, when driving downwards, the overlap area U is lengthened and the horseshoe H becomes larger.

Figure 6:
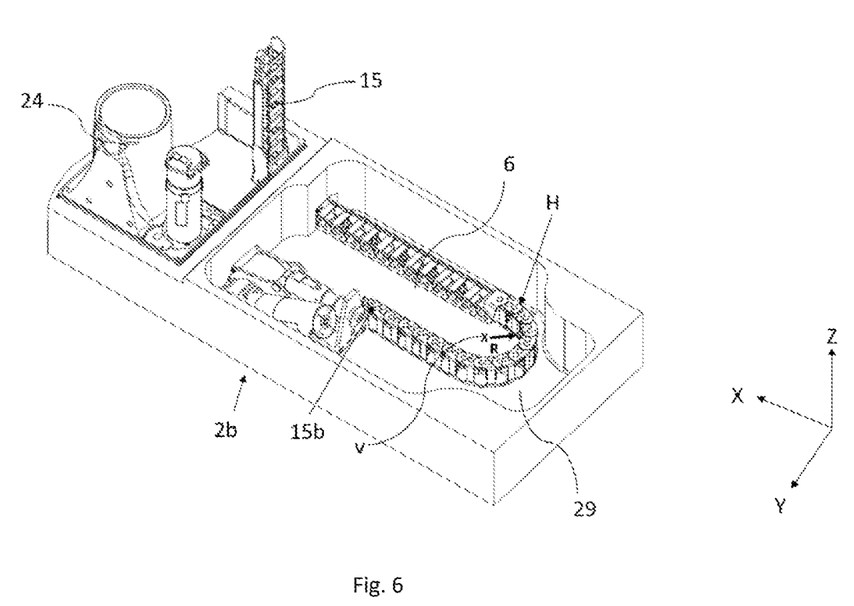
FIG. 6 is a perspective plan view of another embodiment of a table column according to the disclosure with a section of the cable routing device horizontally arranged in the column base.

The horseshoe H shown in FIGS. 2 and 4 is arranged in the magazine 6 upright on the edge. In other embodiments, however, the horseshoe H can be arranged lying flat in the magazine 6, see FIG. 6. Such an arrangement can be implemented by rotating the energy chain 15 arranged in the column base 2 in the X direction. The horseshoe H is tilted by 90° about an axis running parallel to the X-axis (see FIG. 6).

In the embodiment of the present table column 1 shown in FIGS. 2 and 4, the bending radius R of the energy chain 15 is approximately 75 mm. With this bending radius R, a sufficient service life of all cables and hoses used can be ensured. However, other bending radii that guarantee compliance with the smallest permissible bending radius of the cables and hoses are not excluded.

The guide device 4 further comprises at least one deflection plate 16 for deflecting the energy chain 15. The deflection plate 16 of FIG. 4 comprises a deflection section 16*b* extending in the X direction on the lower plate 29 of the column base 2 and a guide section 16*a* arranged vertically thereon, which extends in the Z direction. The deflection plate 16 has a closed, rectangular cross section in the deflection section 16*b* and a U-shaped cross section in the guide section 16*a*. It is used to change the orientation of the energy chain 15 at the transition from the storage section D to the guide section C.

In the upper area on both lateral edges, the section 16*a* of the deflection plate 16 has angled projections 37 which guarantee that the energy chain 15 is guided in the Z-direction without compression or kinks. With the present design of the table column 1, the energy chain 15 itself must be able to withstand thrust forces without kinking. For this reason, the vertical section 16*a* of the deflection plate 16 is designed to be as long as possible in relation to the given installation space. An energy chain 15 suitable for this application is, for example, the cable chain of the 1400/1500 series from IGUS®.

The guide section C of the guide device 4 comprises the upper end 15*a* of the energy chain 15, which is firmly fastened to the linear guide 7. The linear guide 7 is fastened at an upper end to a column cover carrier 23. The linear guide 7 is illustrated in more detail in FIG. 5. The linear guide 7 comprises an outer mounting element 39, a rail 8 and a carriage 9 that can be moved on the rail 8.

Figure 5:
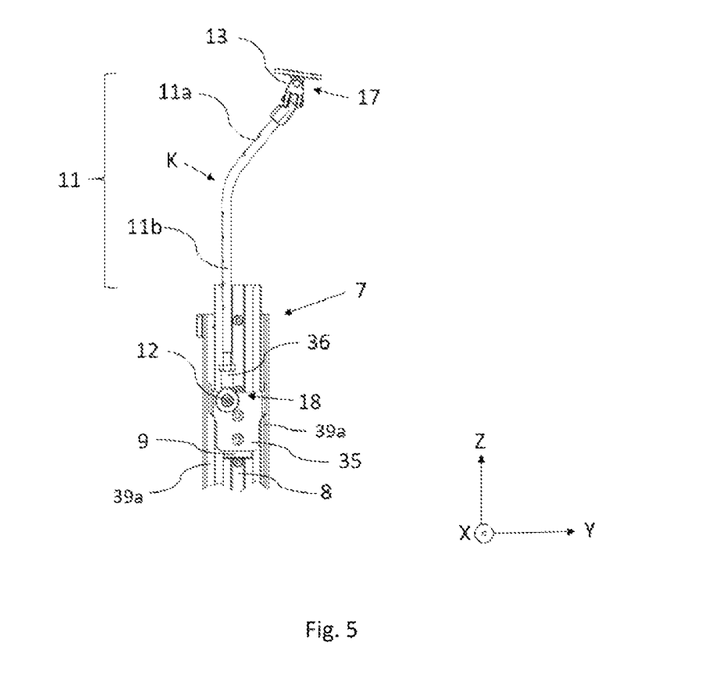
FIG. 5 is a perspective view of a linear guide and a push rod of the cable routing device.

The holding element 39 is designed as an elongated support plate with lateral projections 39*a* (cf. FIGS. 3 and 5). It extends in the Z direction while the protrusions 39*a* extend in the X direction. The mounting element 39 is arranged on a side of the rail 8 opposite the energy chain 15 and the carriage 9. It is firmly connected to the rail 8 and is used to rigidly fasten the linear guide 7 to the column cover carrier 23. The mounting element 39 has a width which matches the width of the rail 8.

The carriage 9 is arranged on the rail 8 such that it can move up and down parallel to the Z-axis on the rail 8 during the height adjustment of the additional lifting device 304 and/or during the tilting and inclination of the patient support surface 51.

A connecting element 35 is attached to the carriage 9. The top link of the energy chain 15 is fastened to the connecting element 35 (for example made of bent sheet metal). As a result, both the connecting element 35 and the upper end 15*a* of the energy chain 15 together with the carriage 9 can be moved on the rail 8 relative to the mounting element 39 and the column cover carrier 23. The linear guide 7 is thus used for vertical adjustment of the energy chain 15 and thus of the cable and hose position along the Z-axis during a lifting movement of the table column 1.

The linear guide 7 can be in the form of a prismatic guide. Such a prismatic guide can be implemented, for example, with a DRYLIN® guide system from IGUS®, which comprises a rail made of extruded aluminum and a carriage with running surfaces made of tribologically optimized plastics. Other guide systems, such as a recirculating ball system, are also conceivable. Such linear guide systems are lubrication-free, wear-resistant, and have a small size.

The guide device 4 shown in FIG. 2 also has the push rod 11. The wiring harness leading out of the energy chain 15, which harness comprises a bundle of cables and hoses 5, runs in this variant of the guide device 4 along the push rod 11 into the connection unit 10. The wiring harness 5 is fastened with cable ties 38 along the push rod 11 (see FIG. 3). In other embodiments of the guide device 4 according to the disclosure, the lines 5 do not necessarily have to be fastened to the push rod 11 and can, for example, be freely arranged between the connecting element 35 connected to the energy chain 15 and the connection unit 10.

The lower end 18 of the push rod 11 is fastened via a first joint 12 to a surface of the connecting element 35 facing the column shaft 3. An upper end 17 of the push rod 11 is fastened via a second joint 13 to the connection unit 10. The push rod 11 has a point of curvature K and two straight sections extending from the point of curvature K, a shorter upper section 11*a* and a longer lower section 11*b* (see FIG. 5).

The first joint 12 shown in FIG. 5 has three rotational degrees of freedom and can for example be designed as a ball joint. As a result, the push rod 11 can be pivoted about the X axis, among other things. At the lower end 18 of the push rod 11, the angular movements are relatively small, such that, for example, commercially available joint bearings or ball heads 36 can be used.

At the upper end 17 of the push rod 11, the angular movement is large with up to 45° for the inclining movement and up to 30° for the lateral tilting movement. For this reason, and in order to prevent undesired rotation of the push rod 11 about the Z axis, the second joint 13 is designed as a joint with two rotational degrees of freedom. The joint 13 can be designed, for example, as a universal joint in the form of a gimbal joint. The second joint 13 can, however, also be designed as a constant velocity joint or a flexible spring or rubber joint.

For the connection unit 10 to be pivoted as optimally as possible about the X and Y axes, the second joint 13 of the push rod 11 and the central joint 14 of the lifting cylinder 27 have the same number of degrees of freedom. The second joint 13 has the same orientation as the universal joint 14, i.e. the two joints 13, 14 are arranged on the connection unit 10 such that they allow the connection unit 10 to pivot in the same direction about the X and/or Y axis. In this arrangement, the push rod 11 displaces the cable harness fastened thereto depending on the actual position of the connection unit 10. Thanks to this alignment of the second joint 13, a rotary movement of the push rod 11 about the Z-axis is caused by an angular error which arises when the gimbal joint 14 is deflected is used such that the space required for the movement of the push rod 11 is minimized and collisions with neighboring components of the table column 1 can be avoided. Furthermore, as much space as possible is created for the guided cables and hoses 5, which are fastened along the push rod 11 with cable ties 38. The local enlargement W in FIG. 3 shows in detail how the second joint 13 is fastened to the connection unit 10.

In alternative arrangements according to the disclosure within a different installation space situation, the alignment of the second joint 13 can be different from that of the gimbal joint 14, which inevitably leads to a changed effect of the angle error. In connection with a different installation space situation, however, the changed effect of the angle error can prove to be advantageous for the overall arrangement.

The operation of the cable routing device 4 according to the disclosure is as follows:

It is assumed that the table column 1 is in the fully retracted state. The main lifting device 302 is then first activated, such that the column shaft stem 40 moves upwards relative to the column shaft base 24. Since the column cover carrier 23 is not only connected to the outer mounting element 39 of the linear guide 7, but is also fastened to the column head 21 (FIG. 3), the column cover carrier 23 also moves upwards. As a result, the entire linear guide 7 is moved along the Z axis. However, there is no relative movement of the components 9, 35, and 15 to the rail 8. In the process, the energy chain 15 coupled to the carriage 9 by means of the connecting element 35 is gradually pulled out of the magazine 6.

As soon as the height of stroke of the main lifting device 302 has ended, the additional lifting device 304 is activated in the second step. As a result, the column head adjusting unit 303 rises in relation to the column head base 301. The position of the column cover carrier 23 fastened to the column head 21 remains unchanged. Thus, the position of the rail 8, which is rigidly connected to the column cover carrier 23 by means of the mounting element 39, does not change either. During the height adjustment of the additional lifting device 304, however, the carriage 9 guided on the rail 8 moves together with the upper end 15a of the energy chain 15 in the Z direction. As a result, this second height adjustment is reproduced thanks to the linear guide 7 by the energy chain 15. The carriage 9 is pulled upwards by means of the push rod 11.

As soon as the height of stroke of the additional lifting device 304 has ended, lateral tilting and inclination of the connection unit 10 is achieved in a third step by actuating the tilting device 310 and the inclining device 308. This further movement can be traced by the cables and hoses leading into the connection unit 10 thanks to the joints 12 and 13 of the push rod 11. The movement of the push rod 11, which is connected to the carriage 9 by means of the connecting element 35, results in an up and down movement of the carriage 9 on the rail 8, which in turn results in a vertical movement of the energy chain 15.

In particular, by combining an energy chain, a linear guide and an articulated push rod, reliable and space-saving cable routing can be implemented in an operating table column.

The present disclosure also includes methods for using the operating table columns and operating tables described. The columns and tables described can also be used as part of more complex surgical arrangements in conjunction with medical devices and instruments. In these arrangements, one or more parts can be controlled and/or supplied with energy via the power and/or data cables 5. These methods can include lifting, lowering and/or pivoting the connection unit 10, as well as the patient support surface carried by the connection unit 10, the patient, and medical devices carried by the connection unit 10. The lifting, lowering and/or pivoting can take place in various processes by means of the lifting cylinders described. The cable routing device 4 or parts thereof pivot, bend and/or adapt in the process to follow the movements of the connection unit 10. In this way, the corresponding devices on the connection unit 10 are always reliably supplied with power and/or control signals. The chain 15 and the push rod 11 follow the movement of the connection unit 10 and adapt to it, as is described in the present application. The methods included may include the disclosed movements of the push rod 11, the first joint 12, the second joint 13, and the carriage 9. The movements of the connection unit 10 and the lifting cylinder 25 can be controlled directly by a user. Alternatively, the control can be carried out by a computer or some other electronic control device. The present disclosure also includes electronic instructions, programs, and circuits for controlling the operation of the operating table column described and other described devices, as well as for carrying out the described methods.

The invention claimed is:

1. An adjustable table column for an operating table, comprising:
    a column base for placing the table column on a floor;
    a height-adjustable column shaft with a stationary column shaft base and a column shaft stem that can be moved up and down relative to the column shaft base;
    a connection unit for connecting a patient support surface to the table column, wherein the connection unit is pivotable in relation to the column shaft stem; and
    a cable routing device for carrying at least one power and/or data cable along the column shaft stem during its up and down movement, wherein the cable routing device comprises an articulated push rod having an upper end mechanically connected to the connection unit and a lower end mechanically connected to a connecting element of the column shaft stem and to an energy chain accommodating the at least one power and/or data cable and having an upper end connected to the connecting element and a lower end,
    wherein, during at least one of height adjustment of the column shaft and movement of the connection unit, the articulated push rod is moved which results in vertical movement of the energy chain, such that the at least one power and/or data cable adjusts its position accordingly.

2. The table column according to claim 1, wherein the lower end of the push rod is linked to the connecting element of the column shaft stem via a first joint and its upper end is fastened to the connection unit via a second joint.

3. The table column according to claim 2, wherein the push rod is curved.

4. The table column according to claim 2, wherein the first joint is a ball joint.

5. The table column according to claim 2, wherein the second joint is a gimbal joint, a constant velocity joint, a flexible spring, or rubber joint.

6. The table column according to claim 2, wherein the connection unit is pivotable via a pivot joint and the second joint has the same orientation as the pivot joint.

7. The table column according to claim 1, wherein the cable routing device further comprises a linear guide, by means of which the at least one power and/or data cable can be moved vertically when the column shaft is adjusted in height.

8. The table column according to claim 1, wherein the cable guide device furthermore has a magazine, located in the column base, for stowing excess cable length.

9. The table column according to claim 8, wherein the lower end of the energy chain is fastened in the magazine.

10. The table column according to claim 9, wherein a lower part of the energy chain is arranged in the magazine in the form of a horseshoe.

11. The table column according to claim 10, wherein the horseshoe is arranged in the magazine standing upright on the edge.

12. The table column according to claim 10, wherein the horseshoe is arranged lying flat in the magazine.

13. The table column according to claim 1, wherein the push rod comprises a point of curvature and two straight sections extending from the point of curvature.

14. The table column according to claim 13, wherein the two straight sections comprise a shorter upper section and a longer lower section.

15. The table column according to claim 1, wherein the energy chain comprises a plurality of articulated chain links in the form of tabs, each of which comprises two sides arranged parallel to one another with a plurality of spaced apart transverse webs that define a guide channel for the at least one power and/or data cable.

16. An adjustable table column for an operating table, comprising:
   a column base for placing the table column on a floor;
   a height-adjustable column shaft with a stationary column shaft base and a column shaft stem that can be moved up and down relative to the column shaft base;
   a connection unit for connecting a patient support surface to the table column, wherein the connection unit is pivotable in relation to the column shaft stem; and
   a cable routing device for carrying at least one power and/or data cable along the column shaft stem during its up and down movement, wherein the cable routing device comprises an articulated push rod,
   wherein the upper end of the push rod is mechanically connected to the connection unit and its lower end is mechanically connected to the column shaft stem, such that the at least one power and/or data cable adjusts its position accordingly when moving the connection unit,
   wherein the cable routing device further comprises a linear guide, by means of which the at least one power and/or data cable can be moved vertically when the column shaft is adjusted in height, and
   wherein the linear guide comprises a rail and a carriage which can be moved on the rail and to which the at least one power and/or data cable is fastened.

17. The table column according to claim 16, wherein the cable guide device furthermore has a magazine, located in the column base, for stowing excess cable length.

18. The table column according to claim 17, wherein the cable routing device furthermore has an energy chain accommodating the at least one power and/or data cable.

19. The table column according to claim 18, wherein an upper end of the energy chain is fastened to the linear guide.

20. The table column according to claim 18, wherein a lower end of the energy chain is fastened in the magazine.

* * * * *